United States Patent

Matsufuji et al.

[11] 4,380,690
[45] Apr. 19, 1983

[54] HYBRID CIRCUIT

[75] Inventors: Teruo Matsufuji, Koganei; Akira Hirato, Ebina; Yoshihiro Kawada, Hitaka, all of Japan

[73] Assignee: Iwasaki Tsushinki Kabushiki Kaisha, Japan

[21] Appl. No.: 278,459

[22] Filed: Jun. 29, 1981

[30] Foreign Application Priority Data

Jul. 22, 1980 [JP] Japan .................. 55-99386

[51] Int. Cl.³ ............................................. H04B 1/58
[52] U.S. Cl. ......................... 179/170 NC; 179/170 D
[58] Field of Search ........ 179/170 R, 170 NC, 170 T, 179/170 D

[56] References Cited

U.S. PATENT DOCUMENTS

| | | | |
|---|---|---|---|
| 3,973,089 | 8/1976 | Puckette | 179/170 NC |
| 4,163,878 | 8/1979 | Hashemi | 179/170 NC |
| 4,181,824 | 1/1980 | Seidel | 179/170 NC |
| 4,203,005 | 5/1980 | Fukuda et al. | 179/1 CN |
| 4,284,859 | 8/1981 | Araseki | 179/170 NC |

FOREIGN PATENT DOCUMENTS 2450853  4/1975  Fed. Rep. of Germany ..... 179/170 NC

*Primary Examiner*—G. Z. Rubinson
*Assistant Examiner*—Randall P. Myers
*Attorney, Agent, or Firm*—Robert E. Burns; Emmanuel J. Lobato; Bruce L. Adams

[57] ABSTRACT

A hybrid circuit, in which the differential output of an amplifier of the four-wire receive port having the differential output of low output impedance is connected to a series-connected circuit composed of a variable impedance circuit and the primary winding of a transformer connected to the two-wire port of the hybrid circuit, and in which the input of an amplifier of the four-wire transmit port of the hybrid circuit having a high input impedance is connected to the node connection of the variable impedance circuit and the primary winding of the transformer. In the case where the impedances of the variable impedance circuit and the transformer are in a state of mutual equilibrium, the neutral point potential of the amplifier of the four-wire receive port is applied as an input to the amplifier of the four-wire transmit port.

1 Claim, 4 Drawing Figures

HYBRID CIRCUIT

BACKGROUND OF THE INVENTION

The present invention relates to a hybrid circuit which performs two wire-four wire conversion in a trunk of an exchange, speech paths of various communication equipment and a line circuit of time-division multiplex communication equipment.

Conventional circuits of this kind are a hybrid transformer system and a resistance hybrid system forming a bridge of resistors. These conventional circuits have defects such that the output of an amplifier of the four-wire receive port is so consumed as to result in a loss, that a hybrid transformer is expensive and bulky, and that impedance balance is difficult.

SUMMARY OF THE INVENTION

An object of the present invention is to provide a hybrid circuit which can easily be formed and is designed to be able to send out under a low-loss a signal to the two-wire port through the use of a differential output type amplifier at the four-wire receive port so as to overcome the abovesaid drawbacks of the prior art.

In accordance with the present invention, there is provided a hybrid circuit, in which the differential output of an amplifier of the four wire receive port having a low impedance differential output is connected to a series-connected circuit composed of a variable impedance circuit and the primary winding of a transformer connected to the two-wire port of the hybrid circuit; and in which the input of an amplifier of the four-wire transmit port of the hybrid circuit having a high input impedance is connected to the mode connection of the variable impedance circuit and the primary winding of the transformer. In the case where the impedances of the variable impedance circuit and the transformer are in a state of mutual equilibrium, the neutral point potential of the amplifier of the four-wire receive port is applied as an input to the amplifier of the four-wire transmit port.

BRIEF DESCRIPTION OF THE DRAWINGS

The present invention will hereinafter be described in comparison with prior art with reference to the accompanying drawings, in which.

DETAILED DESCRIPTION

Figure 1:
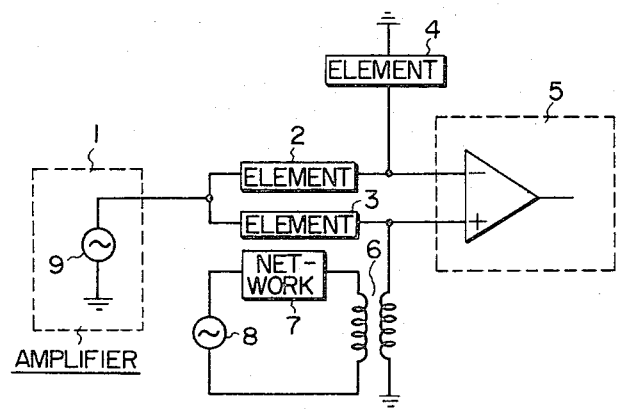
FIG. 1 is a circuit diagram showing a conventional hybrid circuit of differential input type.

With reference to FIG. 1 showing, by way of example, a conventional resistance hybrid circuit of differential input type, a voice output voltage 8 from a telephone set is applied via a network 7 and a transformer 6 of the telephone set to one of two input terminals of an amplifier 5 of the four-wire transmit port, from which the input thereto is transmitted. An output 9 from an amplifier 1 of the four-wire receive port is applied via elements 2 and 3 to two input terminals of the amplifier 5 of the four-wire transmit port and the input to one of the two input terminals is applied via the transformer 6 to the line impedance 7 of the two-wire port. In this case, since both input signals to the amplifier 5 of the four-wire transmit port are mutually cancelled out by a bridge circuit which is constituted by the elements 2, 3 and 4 and the transformer 6, the output 9 from the amplifier 1 of the four-wire receive port does not appear at the output of the amplifier 5 of the four-wire transmit port.

However, this conventional circuit has a defect such that the output from the amplifier 1 of the four-wire receive port is consumed by the elements 2 and 4, resulting in a loss, as depicted in FIG. 1. Further, the hybrid transformer system is defective in that a hybrid transformer is expensive and bulky and in that the impedance balance is difficult.

With reference to the accompanying drawings, the present invention will hereinafter be described in detail.

Figure 2:
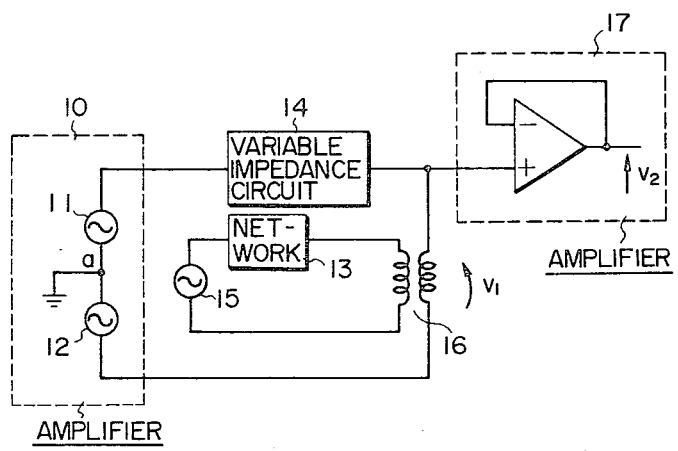
FIG. 2 is an equivalent circuit diagram of an object circuit to which the present invention is to be applied.

FIG. 2 illustrates an equivalent circuit to which the present invention is to be applied. Letting differential output voltages 11 and 12 from an amplifier 10 of the four-wire receive port be represented by $\pm e_2/2$, the impedance of a line impedance 13 of a two-wire port by $\dot{Z}_1$, a voice output voltage 15 of the telephone set of the two-wire port by $e_1$, the turn ratio of a transformer 16 by $n:1$, the impedance of a variable impedance circuit 14 by $\dot{Z}_2$, a voltage across the transformer 16 by $v_1$ and the output voltage from an amplifier 17 of the four-wire transmit port by $v_2$, the voltages $v_1$ and $v_2$ are given as follows:

$$v_1 = \frac{\dot{Z}_2}{\dot{Z}_1/n^2 + \dot{Z}_2} \cdot \frac{e_1}{n} + \frac{\dot{Z}_1/n^2}{\dot{Z}_1/n^2 + \dot{Z}_2} \cdot e_2 \quad (1)$$

$$v_2 = v_1 - \frac{e_2}{2} = \frac{\dot{Z}_2}{\dot{Z}_1/n^2 + \dot{Z}_2} \cdot \frac{e_1}{n} + \frac{1}{2} \cdot \frac{\dot{Z}_1 n^2 - \dot{Z}_2}{\dot{Z}_1/n^2 + \dot{Z}_2} \cdot e_2 \quad (2)$$

In this case, if it is true that $\dot{Z}_1/n^2 = \dot{Z}_2$, then it follows that $$v_1 = \frac{1}{2} \cdot \frac{e_1}{n} + \frac{1}{2} e_2 \quad (3)$$

$$v_2 = \frac{1}{2} \cdot \frac{e_1}{n} \quad (4)$$

Expression (3) means that the output from the amplifier 10 of the four-wire receive port is sent out to the line impedance 13 of the two-wire port at a necessary and minimum loss and expression (4) means that the output $\pm e_1/2$ from the amplifier 10 of the four-wire receive port does not appear at the output of the amplifier 17 of the four-wire transmit port after being greatly attenuated by the equilibrium between impedances $\dot{Z}_1/n^2$ and $\dot{Z}_2$.

Figure 3:
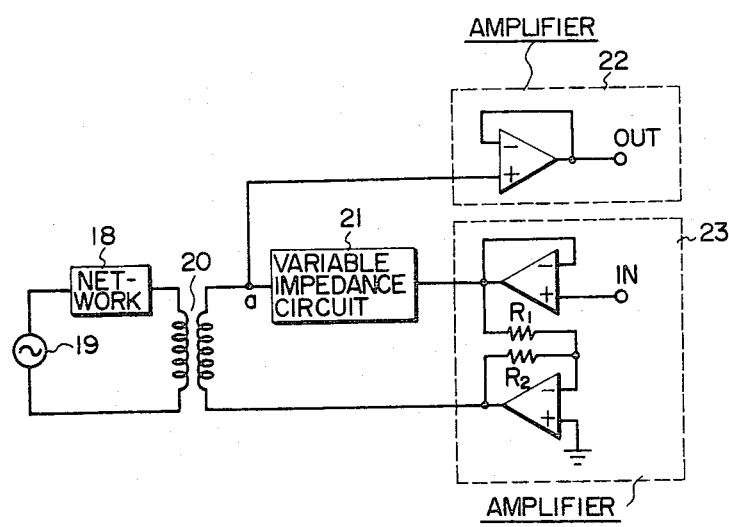
FIG. 3 is a circuit diagram illustrating an embodiment of the present invention.

Next, a description will be given, with reference to FIG. 3, of an embodiment of the present invention. Let the turn ratio of a transformer 20 be represented by 1:1, the impedance of the transformer 20 viewed from a node point a by $\dot{Z}_1$ and the impedance of an element 21 by $\dot{Z}_2$, and further a condition: $\dot{Z}_1 = \dot{Z}_2$ is satisfied. A voice output voltage 19 from a telephone set of the two-wire port is applied via a line impedance 18 of the two-wire port and the transformer 20 to a path of a variable impedance circuit 21 and an amplifier 23 of the four-wire receive port and a path of the input of an amplifier 22 of the four-wire transmit port. In this case, the potential at the node point a is applied as the input to the amplifier 22 of the four-wire transmit port but the output impedance of the amplifier 23 of the four-wire receive port is substantially zero, so that if $\dot{Z}_1 = \dot{Z}_2$ holds, then the voice output voltage 19 from the telephone set of the two-wire port is transmitted to the amplifier 22 of the four-wire transmit port at a necessary and minimum loss.

The output from the amplifier 23 of the four-wire receive port is applied via the variable impedance circuit 21 to the transformer 20 and the amplifier 22 of the four-wire transmit port but since the input impedance of the amplifier 22 of the four-wire transmit port is very high, if an equilibrium condition $\dot{Z}_1 = \dot{Z}_2$ holds, then the abovesaid output of the amplifier 23 of the four-wire receive port is transmitted to the line impedance 18 of the two-wire port at a necessary and minimum loss. In this case, the neutral-point potential of the amplifier 23 of the four-wire receive port is applied to an input a to the amplifier 22 of the four-wire transmit port under the above equilibrium condition.

The amplifier 23 of the four-wire receive port is formed by an operational amplifier and if resistances $R_1$ and $R_2$ are selected to be equal to each other, a substantially ideal differential output can be obtained.

Figure 4:
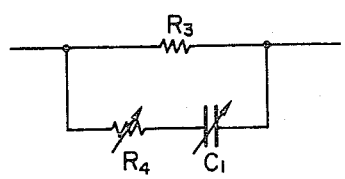
FIG. 4 is a circuit diagram illustrating an example of a variable impedance circuit for use in the present invention.

FIG. 4 illustrates an example of the variable impedance circuit 21. It has been ascertained that a return loss by the application of the output from the amplifier 23 of the four-wire receive port to the amplifier 22 of the four-wire transmit port can easily be held at about 20 dB, for example, by selecting the resistance value of a resistor $R_3$ to be 600 $\Omega$ and adjusting a resistor $R_4$ and a capacitor $C_1$.

The present invention possesses advantages such that an efficient and easy-to-adjust hybrid circuit can be formed by a small number of elements through the use of an amplifier of high input impedance at the four-wire transmit port and an amplifier of balanced output of low output impedance at the four-wire receive port, as has been described in the foregoing.

What we claim is:

1. A hybrid circuit comprising:
   a series-connection composed of a variable impedance circuit and the primary winding of a transformer connected to the two-wire port of the hybrid circuit;
   an amplifier of the four-wire receive port of the hybrid circuit having a differential output of low impedance connected across said series-connection; and
   an amplifier of the four-wire transmit port of the hybrid circuit having a high input impedance connected to the node connection of the variable impedance circuit and the primary winding of the transformer, the impedances of the variable impedance circuit and the primary winding of the transformer being in a state of mutual equilibrium, and the neutral point potential of the amplifier of the four-wire receive port being applied to an input to the amplifier of the four-wire transmit port.

* * * * *